（12） United States Patent
Abendroth et al.

(10) Patent No.: US 8,683,604 B2
(45) Date of Patent: Mar. 25, 2014

(54) SYSTEM FOR PROTECTING PERSONAL DATA

(75) Inventors: Joerg Abendroth, Munich (DE); Markus Bauer-Hermann, Aicha vorm Walrd (DE); Robert Seidl, Königsdorf (DE)

(73) Assignee: Nokia Solutions and Networks Oy, Espoo (FI)

( * ) Notice: Subject to any disclaimer, the term of this patent is extended or adjusted under 35 U.S.C. 154(b) by 88 days.

(21) Appl. No.: 13/378,447

(22) PCT Filed: Jun. 30, 2009

(86) PCT No.: PCT/EP2009/058217
§ 371 (c)(1),
(2), (4) Date: Dec. 15, 2011

(87) PCT Pub. No.: WO2011/000417
PCT Pub. Date: Jan. 6, 2011

(65) Prior Publication Data
US 2012/0110677 A1    May 3, 2012

(51) Int. Cl.
*H04N 7/16*    (2011.01)
(52) U.S. Cl.
USPC .......................................... 726/26
(58) Field of Classification Search
USPC .......................................... 726/26
See application file for complete search history.

(56) References Cited

U.S. PATENT DOCUMENTS

2008/0071808 A1  3/2008 Hardt et al.
2009/0217342 A1* 8/2009 Nadler ............................. 726/1

OTHER PUBLICATIONS

International Search Report and Written Opinion corresponding to International Application No. PCT/EP2009/058217 dated Sep. 14, 2010.
Hansen et al., "Identity management throughout one's whole life", Information Security Technical Report, Elsevier Advanced Technology, vol. 13, No. 2, May 1, 2008, pp. 83-94, XP025474739.
Hansen et al., "Privacy and Identity Management", IEEE Security and Privacy, IEEE Computer Society, vol. 6, No. 2, Mar. 1, 2008, pp. 38-45, XP011207558.
Telco 2.0: Use Cases for Telco 2.0—making it tangible, 2008, http://www.telco2.net/blog/2008/10/an_introduction_to_2sided_mark.html, 3 pages.

* cited by examiner

*Primary Examiner* — Jacob Lipman
(74) *Attorney, Agent, or Firm* — Squire Sanders (US) LLP

(57) ABSTRACT

A method of providing data in response to a search request comprises the steps of a social networking website receiving the search request to provide a pseudonym associated with the real name; the social networking website determining that the search request is for a pseudonym which, within its database, is not associated with the real name; the social networking website referring the search request to a identity management server which contains an association between the pseudonym and the real name; the identity management server determining the pseudonym which is associated with the real name; and the identity management server providing an information item which is related to the pseudonym.

17 Claims, 1 Drawing Sheet

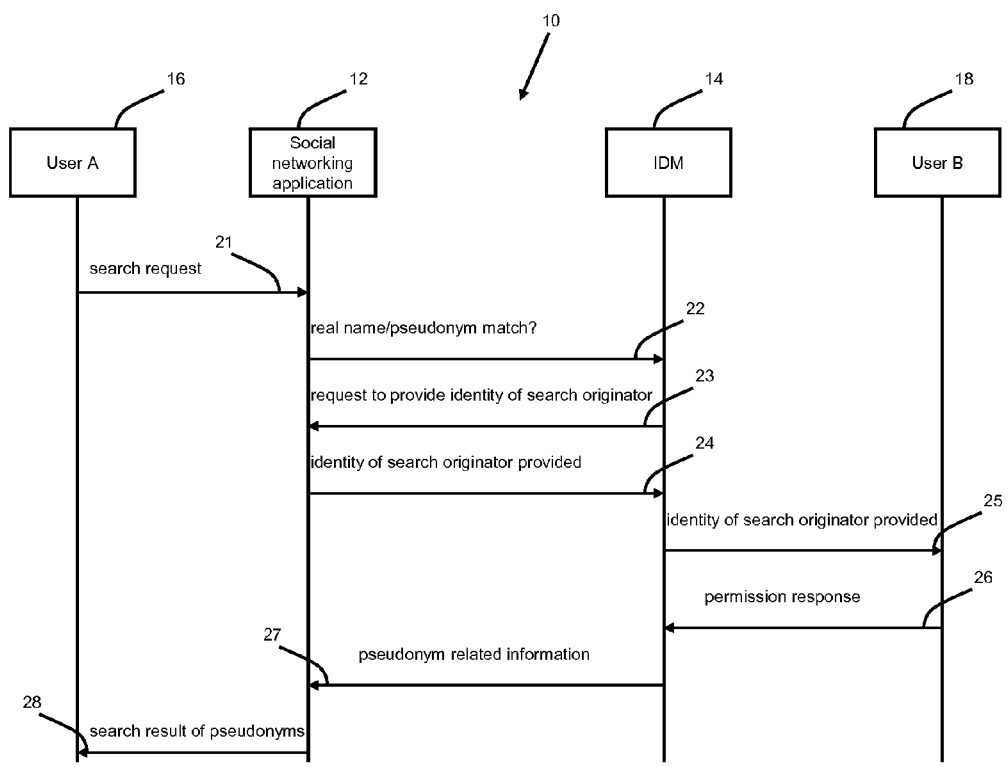

SYSTEM FOR PROTECTING PERSONAL DATA

This invention relates to a system for protecting personal data. It is particularly, but not exclusively, related to a system in which a user or a network element is able to control whether, in relation to personal data provided by the user to a service provider such as a website to make it publicly available, an association is provided between the personal data and the user's real world identity.

A trend over the past few years has been the introduction of aggregation services of personal data which are accessible and searchable via the World Wide Web (the web). Generally referred to as "social networking websites", these typically allow users registered with such a service (and thus having a user account) to create a set of personal data which is viewable (and thus downloadable) in the form of a "user page" or "user pages" by other people accessing the service. In some cases, the other people also need to be registered with the service in order to access user pages, although this is not always the case. However, if registration is required, this can be carried out with a small amount of effort and generally there are no restrictions on who is eligible to register.

It will be appreciated that the term "personal" does not mean private since the data is provided to service provider websites for the purpose of being provided to others. Instead it means applicable to a particular user and, in many cases, the personal data taken as a whole will be unique to that user.

Users' accounts in social networking websites are typically configured so that when a user's user page is provided to other people, the user is identified by a pseudonym rather than by their own name.

Social networking websites encourage the introduction into the public domain of a wide range of users' personal information, for example user-generated text, photographs, and video recordings. In certain circumstances, while introducing this information into the public domain today might seem harmless, in the future its public availability might not be so desirable. It might be embarrassing or it might be potentially career-limiting were it to fall within the awareness of an employer or a prospective or potential employer.

One way to tackle this is for authority figures, such as parents, governments, or other advice-giving entities, to recommend that users be discreet with the information they put into a searchable public domain. However, some users, for example young people, do not always follow such recommendations. In addition, the number and scope of social networking websites is changing all of the time and advice on prudent practice can quickly become out of date.

Furthermore, presenting personal information in conjunction with a pseudonym does not necessarily provide an adequate safeguard because in some cases a social networking website may additionally provide search results linking a user's real name and their pseudonym as a result of a search being carried out on the social networking website.

An information management system called Microsoft Infocard has been proposed. An InfoCard-enabled relying website that requires certain identity information from a user sends a web page to an InfoCard client on the user's personal computer which determines which personal information is requested by the InfoCard-enabled relying website, and then provides it in the form of a user selected XML document digitally signed by an identity provider.

According to a first aspect of the invention there is provided a method of providing data in response to a request comprising the steps of:

a first entity receiving a request to provide data associated with an attribute;
the first entity determining that the request is for data which within the first entity is not associated with the attribute;
the first entity referring the request to a second entity which contains an association between the data and the attribute;
the second entity determining the data which is associated with the attribute; and
the second entity providing an information item which is related to the data.

Preferably, the first entity is a service provider. It may be a social networking application/website.

Preferably, the request is a search request in respect of a real name to identify a pseudonym of a user registered with the service provider having that real name.

Preferably, the data is a pseudonym. Preferably, the attribute is a real name.

Preferably, the second entity is an identity management element. It may contain associations between real names of users registered with the service provider and the pseudonyms they use in a correspondingly provided service.

Preferably, the second entity provides the information item to the first entity. The first entity may then provide the information item as a response to the request.

The data related item can be the data or a place holder. If the data related item is not the data, it can be used to obtain the data, for example directly from the second entity and not via the first entity. This can be as a result of the second entity receiving a follow-up request from the requester.

Preferably, there are two classes of users who are registered with a first entity: (i) first entity-controlled users and (ii) second entity-controlled users.

Preferably, a near-complete user record is stored in the first entity and certain key information is stored elsewhere.

Preferably, an association or mapping between the user's real name and the user's pseudonym used in connection with the service is stored in the second entity.

Preferably, certain personal information additional to a real name and pseudonym which is considered to be private is also stored in the second entity.

Preferably, the second entity is under the control of a network operator.

Preferably, the first entity control a data structure of a first store containing a list of second entity-controlled users in terms of their pseudonyms and associated personal data and a second store containing a list of real names of the users in which the first and second stores are not associated with each other.

Preferably a user who is registered with the first entity, a search originator, submits a search request. It may be submitted to the first entity. It may be submitted by the first entity to the second entity. The second entity may request the first entity to provide identity information to identify the search originator. The identity information may be provided to an individual identified by a search carried out in response to the search request.

The individual identified by the search may provide a permission response to the second entity.

In handling the request, a search may be carried out within the first entity for first entity-controlled users, and a search may be carried out by the second entity for second entity-controlled users.

The second entity may carry out the function of translating a pseudonym into a real name and providing this to the individual identified by the search.

The handling of the request by the second entity may be based on policy rules. The policy rules may be carried out by a policy block located in the second entity.

The second entity may be capable of serving a number of first entities. A response to a search request from a user to locate one individual in one first entity which included revealing the association may result in automatic revealing of an association in another first entity in respect of that individual in the event of the user submitting another search request.

Preferably, if the second entity is not to provide an information item which is related to the data, it may be revealed that an association exists but the data or the information item which is related to the data may not be provided. In such a case, an invitation may be provided to an originator of the request to contact the second entity directly to be provided with the information requested.

The request originator may be provided with an indication that an association between the data and the attribute does not exist when in fact it does exist.

The second entity may contain an association between at least two of a user's real identity, identifying information of the user, a set of websites/services/applications with which the user is registered or with which the user has an account, and a list of pseudonyms associated with respective ones of the websites/services/applications.

Preferably, the attribute is a trader's identity and data associated with it may be other identities of the trader. However, the second entity may use this association to provide other information, in this case feedback, reputation, or other information which can be used by a potential or actual customer to assess the trader. This shows another aspect of the invention, the associated data itself might not be provided but might lead to the provision of other information.

Preferably, the second entity contains a historical record in respect of a user's real name. This may be an association between maiden names and married names.

Preferably, the second entity can be used to provide information based on contact lists. A contact list associated with a previous first entity can be used to enable a user to locate, in respect of contacts present in the list, pseudonyms of the contacts in a new first entity.

Preferably, the second entity can be used to provide information about contacts in other first entities. In this case, the second entity may use contact information for a first entity to carry out a search to reveal pseudonyms which the contacts use in other first entities.

Preferably, the invention is capable of revealing an association between an attribute or attributes of a user, other than between the user real name, and a pseudonym.

Preferably, the request may locate users registered with a first entity having an attribute in common.

Preferably, the request may be in respect of location information. In this case, the location information may be stored other than in the first entity. It may be real time automatically-updated location information in respect of a user's mobile terminal device.

Preferably, an account of a corporate entity such as a company can be searched on to reveal a different employee or representative who is associated with the account based on the nature of the request, for example whether a request has a geographical indicator.

Preferably, the invention is capable of arranging for on-the-fly translation of pseudonyms into real names.

Preferably, the request only goes to the second entity if the first entity determines that the attribute is one which is controlled by the second entity.

Preferably, the second entity is used to provide targeted advertisements relevant to a particular user of the first entity. The second entity may get suitable advertisement from a network element comprising a database containing preferences associated with attribute. The second entity may then send to the first entity either a link or a placeholder which points to or refers to relevant advertising content. The placeholder may be an alpha-numeric string which is meaningless to any entity other than the second entity. Use by a terminal device of the placeholder causes the terminal device to contact the second entity which then sends the relevant advertising content to the terminal device.

According to a second aspect of the invention there is provided a system for providing data in response to a request comprising:

a first entity capable of receiving a request to provide data associated with an attribute and capable of determining that the request is for data which is not associated with the attribute within the first entity; and a second entity containing an association between the data and the attribute which is capable of receiving the request from the first entity, the second entity being capable of determining the data which is associated with the attribute and being capable of providing an information item which is related to the data.

According to a third aspect of the invention there is provided a server for providing a response to a request comprising:

an input block capable of receiving a request to provide data associated with an attribute from a first entity which has determined that the request is for data which is not associated with the attribute within the first entity;

a store containing the data and the attribute and an association between them;

a determining block capable of determining the data which is associated with the attribute; and an output block capable of providing an information item which is related to the data.

According to a fourth aspect of the invention there is provided a computer program product comprising software code that when executed on a computing system performs a method of providing data in response to a request comprising the steps of:

a first entity receiving a request to provide data associated with an attribute;

the first entity determining that the request is for data which within the first entity is not associated with the attribute;

the first entity referring the request to a second entity which contains an association between the data and the attribute;

the second entity determining the data which is associated with the attribute; and the second entity providing an information item which is related to the data.

Preferably, the computer program product has executable code portions which are capable of carrying out the steps of the method.

Preferably, the computer program product is stored on a computer-readable medium.

In an embodiment of the invention, the user may set policies to facilitate quick decision making. Alternatively, a one-by-one grant and deny is possible in order to provide an individual with tight control over their personal information.

Policies, once set, may be revoked at some future point. This may be done by changing policies or permissions which have been given. An individual may even be able to switch request handling from one second entity to another.

An embodiment of the invention will now be described, by way of example only, with reference to the accompanying FIG. 1 which shows a system and associated message flow.

FIG. 1 shows a system 10 and the flow of messages within it as it operates according to the invention. The system 10 comprises a social networking (SN) application 12 connected to an identity manager (IDM) 14.

The SN application 12 provides a service to users enabling them to store their personal information and access the personal information of other users of the service. It runs on a processor or processors in a server which has access to a database (not shown). The database stores a number of user accounts relating to users who have registered with the SN application 12 via its web presence in the form of a SN website. In registering with the service, users provide to it a necessary minimum of personal information. The SN application 12 is able to access the database in order that it can download information, upload information, and modify user accounts within the database.

The IDM 14 may be a stand-alone element or may be incorporated into an Identity Management network element, which carries out a number of different identity-related tasks such as managing single sign-on (SSO) to enable a user to log in once and gain access to a variety of applications (for example web-based applications) without needing to log in again at each of them.

The SN application 12 is able to communicate with users who have registered with it, for example a user A 16 and a user B 18. The IDM 14 is able to communicate with the user B 18.

In the case of the invention, there are two classes of users (SN application 12 users) who are registered with the service provided by the SN application 12: (i) "social network-controlled users" and (ii) "IDM-controlled users". In the case of the former, a complete user record is stored in a SN application 12 (or more specifically in the associated database) including the user's real name, their pseudonym used in connection with the service, background information in respect of the user, such as birth date, age, and home location, and personal information which is useable to generate the user's user page or pages. In the case of the latter, a near-complete user record is stored in the SN application 12 and certain key information is stored elsewhere. In one embodiment of the invention, an example of this key information is an association or mapping between the user's real name and the user's pseudonym used in connection with the service. This may be achieved by storing the user's real name in the SN application 12 but not associating it with their near-complete user record. Instead, the IDM 14 contains an association between the user's real name and their pseudonym. In such a case, the near-complete record may contain a "dummy" or blank entry in respect of the user's real name which is recognisable as such by the SN application 12. In other embodiments of the invention, certain additional personal information which the IDM-controlled user considers to be private, such as their birth date, age, and location, are also stored in the IDM 14 in association with their real name and pseudonym and are not stored in the SN application 12. This information is referred to as IDM-controlled information. In the following, it is to be understood that the user B is an IDM-controlled user.

An account may be set up as an IDM-controlled user account rather than as a conventional social network-controlled account by a user electing to do so when setting up the account with the service. This may involve the user identifying that the account is to be IDM-controlled and to identify an entity, such as an operator, which is responsible for providing IDM functionality and for enabling it to interact with the SN application. In this case, the user may enter appropriate IDM-controlled information into the IDM. Alternatively, the user can arrange everything from the IDM end and the IDM keeps certain information (attributes) to be controlled by itself and provides certain information to the SN application.

Accordingly, it can be seen that in one embodiment, the SN application 12 contains a data structure of a first store containing a list of IDM-controlled users in terms of their pseudonyms and associated personal data and a second store containing a list of real names of the IDM-controlled users.

The first and second stores are not associated with/mapped to each other.

The operation of the invention will now be described. The user A 16 is logged into the SN application 12 and decides to search on a person's real name to see if they have registered with the SN application 12 in order to gain access to their user page.

The following messages are then exchanged:
a) the user A sends a real name search request to the SN application 12, message 21;
b) the SN application 12 asks the IDM 14 if there is a pseudonym which corresponds to the real name, message 22;
c) the IDM 14 requests the SN application 12 to provide identity information to identify the search originator, message 23;
d) the SN application 12 provides the identity information to the IDM 14, message 24;
e) the IDM 14 provides the identity information to the user B, message 25;
f) the user B provides a permission response to the IDM 14, message 26;
g) the IDM 14 provides pseudonym-related information to the SN application, message 27; and
h) the SN application 12 provides a search result of pseudonyms to the user A, message 28.

Referring to these steps in more detail, the user A sends a real name search request 21 to the SN application 12. In this case, the real name matches the real name of the user B. However, this does not necessarily mean that the user B is the person the user A wants to identify, just that the real names correspond.

As mentioned above, the mapping between the IDM-controlled users' real names and their pseudonyms is not contained within the SN application 12 but is instead contained within the IDM 14. In this case, every time a real name search is carried out, in addition to a search being carried out in its entirety within the SN application 12 for social network-controlled users, a search needs to be carried out within the IDM 14 for IDM-controlled users.

The SN application 12 receives the search request 21. In order to deal with the different user classes, the SN application 12 carries out:
(i) a real name sub-search in its database in respect of social network-controlled users and deals with the search request in a normal way; and
(ii) a real name sub-search in its database in respect of IDM-controlled users and if any are identified, it sends a message 22 to the IDM 14 indicating that a search is to be carried out for any pseudonyms which match the real name.

The sub-search (ii) may be carried out by using the second store referred to in the foregoing. The SN application 12 then awaits a response from the IDM 14 before providing search results to the user A.

The IDM 14 receives the message 22 issued as a result of the sub-search (ii) and sends a response 23 to the SN application 12 "Please identify the search originator". In one embodiment of the invention, an identity of the search originator is included in the message 22 which means that it is not necessary for the IDM 14 to request the identity of the search originator from the SN application 12. In another embodiment of the invention, a request to identify the search originator might be optional or might even by omitted altogether.

The way in which the SN application deals with the response 23 depends on the nature of the user A. If the user A is a social network-controlled user, it is up to the SN application 12 and to any user settings/policies put in place by the user A to decide what identifying information is to be provided. Accordingly, in step 24, it may provide the user A's real name or, if their identity is protected, it may provide their pseudonym. If the user is an IDM-controlled user, the SN application 12 provides the pseudonym of the user A to the IDM 14 in a message 24.

At this point, the IDM 14 holds the following information in respect of the real name search:
(i) that the real name of at least one of the IDM-controlled users matches the real name of a search request; and
(ii) the identity of the user A either as a pseudonym or as a real name.

Accordingly, the IDM 14 seeks to provide identity information in respect of the user A to the user B in order that the user B may decide whether to permit the user A to be presented with information linking the user B's real name and pseudonym (referred to as association information), and thus enable the user A to see that user B's user page is among those within the SN application 12 that match the real name.

In the case in which the user A is a social network-controlled user, the IDM 14 simply provides their pseudonym or real name to the user B (depending on what is permitted by the SN application 12) in a message 25. In the case in which the user A is an IDM-controlled user, the IDM 14 uses a data-base to translate the provided pseudonym into a real name and provides this to the user B. In addition, or alternatively, the user B may be provided with the pseudonym of user A.

The message 25 also serves as a notification to the user B that a real name search is being carried out in the SN application 12 to locate personal information and an indication of which SN application 12 user is requesting the search, whether in terms of their real name or their pseudonym. The user B can then decide whether or not to permit the release of an indication that their pseudonym corresponds to the real name of the search. Accordingly, the user B can provide a permission response 26, either in the form of "permission granted" or "permission denied" to the IDM 14. This could also be determined by a policy decision in which the user B puts in place a rule (policy) in which a blanket "permission granted" response or a "permission denied" response is to be given in respect of all search-related notifications. In a variant of the invention, the policy may be set to provide a policy decision leading to a "permission granted" response or a "permission denied" response if certain criteria are satisfied. In one embodiment the user may have a blanket policy with certain exceptions in place, for example, a blanket "permission denied" response except in the case of certain individuals/users making a search request in which case a "permission granted" response is provided. Use of policy-based decision making enables the user B not to have to respond individually to each search request.

Handling of policy rules, for example their storage, updating, and invoking in order to make policy decisions, is carried out by a policy block located in the IDM 14 which contains rules determined by the user or present in a selected profile which has been adopted by or assigned to the user. This may include rules such as providing a "permission granted" response if the user A is present in any contact list under the control of the user B. For example, the user B may have indicated to the IDM 14 that it is to control the provision of association information in response to search requests in respect of an identified set of different SN applications, that is, in one embodiment, various SN websites in respect of which the IDM exercises a degree of control, or acts as a "gatekeeper". It can be extended to cover contacts of those contacts (for example friends of friends). Another example of a policy rule is that if a search request is received from a user associated with certain identified service provider/SN websites, or the user has been verified in some way, a "permission granted" response is provided without the user B needing to have been specifically involved in respect of that request.

Policy decision making can be carried out in a way which is transparent both to the user A and the user B.

Policies can be managed by a third party. A user can buy or be given a profile comprising a set of policy rules or use one made by someone else. For example, a parent can control the policies which apply to the user account of their child.

As is explained in the following, the IDM 14 may be capable of serving a number of service providers. In such a case, there may be a policy in place that if in response to a search request for the user B in one service provider has led to a "permission granted" response, then a search for the user B in another service provider will automatically be responded to with a "permission granted" response.

In the case of the permission response 26 being "permission granted", whether this is provided by the user B or as the result of a policy decision, the IDM 14 sends a message 27 to the SN application 12 indicating that the particular pseudonym in respect of the user B who provided the "permission granted" response corresponds to the real name of the search. In the case of the user B having provided a "permission denied" response, the message 27 lacks an indication of a pseudonym in respect of the user B. However, it should be understood that the IDM 14 might have sent out a number of messages 25 to different users having a real name which matches the real name of the search and received a number of permission response 26 so the message 27 to the SN application 12 might contain a number of non-user B pseudonyms from other IDM-controlled users who provided "permission granted" responses. In another embodiment of the invention, rather than just not including any information in respect of the user B, a component in the message 27 in respect of the user B states "no information can be given" or "this user exists" indicating that there is a user but that the IDM 14 is not permitted to reveal their pseudonym.

In a variant of the invention, the user B is able to exercise a greater degree of control in which, although relevant conditions are met such that permission is granted, the pseudonym is not provided to the SN application 12. In this case, the IDM 14 provides an indication to the SN application 12 stating "this user exists" which includes an invitation for the user A to contact the IDM 14 or the user B directly to be provided with the information requested.

After the message 27 is sent, the SN application 12 collates a results set made up of the pseudonyms of the social network-controlled users found as a result of carrying out of the sub-search (i) and the pseudonyms of the IDM-controlled users and any other information found as a result of the carrying out of the sub-search (ii) and the subsequent message exchange with the IDM 14. The results set may contain a number of social network-controlled users and IDM-controlled users since a number of SN application 12 users may have the same real name. Of course, in some cases, the results set of a real name search might only contain the IDM-controlled user who provided the "permission granted" response.

It might also be a result set indicating that no pseudonym matching the real name was found.

The SN application 12 then sends the results set to the user A in a message 28. According to the nature of the message 27, this either contains an indication that there is, or there is not, a particular pseudonym in respect of the user B.

Although it has been mentioned that the user A 16 is logged into the SN application 12, in another embodiment of the invention, the user A can be anonymous as far as the SN application 12 is concerned. In such an embodiment, all that is required is for the user A to provide a form of identity which is passed on to the user B to enable them to decide what kind of permission response to provide.

In the foregoing, the IDM provides pseudonym related information to the user A via the SN application. In another embodiment of the invention, this information is provided directly to the user A. It may be sent by email to an email account of the user A, by a short message service (SMS) message to a mobile telephone of the user A, or by some other means, for example via a plug-in type implementation discussed in the following. It will be understood that because permission needs to be granted by the user B, the pseudonym related information may take some time to be prepared in order that it can be sent as a response, in which case it being delivered outside of the context of the SN application may be convenient.

In one embodiment of the invention, the IDM 14 is capable of serving a number of service provider applications. This may be a number of different instances of the same type of application, for example a number of social networking websites, or a number of different types of application, for example one or more social networking websites and one or more Internet-based discussion forums. In this case, the IDM 14 will have a user record comprising a core identity, which may be the user's real identity (for example the user's real name and other relevant identifying information), a set of websites/services/applications with which the user is registered or with which the user has an account, and a list of pseudonyms associated with respective ones of the websites/services/applications. This means it is possible to find a particular individual on a variety of social networking websites in terms of their pseudonym on each, so long as the individual permits this. As will be appreciated, the invention may be applied to enable an individual to have a number of different identities registered in the same service with different respective pseudonyms, with these identities being linked to the user and thus linked to each other in the IDM 14.

The IDM 14 may be configured to enable the user to set up two or more accounts in the same service provider, a first account containing unfiltered content which a user has not screened for suitability of being viewed by a current or a prospective employer and a second account containing filtered content which has been screened. The second account, referred to as a self-moderated account, may be directly searchable by entities such as employers in order to provide association information between the user's real name and a pseudonym without the need for the user to permit such searching. In this case, the IDM may contain a rule providing an automatic "permission granted" response in respect of the self-moderated account, while a search in respect of the first account follows a procedure corresponding to that of FIG. 1.

In an embodiment of the invention in which the IDM 14 is the central point for a number of separate identities that an individual has on the web, the IDM 14 may be configured to enable an individual to access information which is relevant to such a number of separate identities. In one particular variant, in the case of an individual carrying out trading activities on the web, for example selling goods, they might have separate identities on a number of websites each of which provides a platform for traders to carry out such activities. As far as a potential customer is concerned, each of the trader's identities may have associated with it useful information, for example feedback or reputation information. Accordingly, the IDM 14 is configured to provide this information. This may be arranged by providing a plug-in software component which can be installed on a user's device such as a personal computer. A user has access to one of the individual's identities (a known identity), for example by seeing that identity presented on a website. The user is interested in getting useful information associated with the individual on other websites and so activates the plug-in software component in respect of the known identity. The plug-in software component sends a request to the IDM 14 which, as a result, uses the association information it contains between the individual's various identities, gathers relevant useful information, and then provides it to the user. This can be done without needing to reveal the individual's real identity or any on-line identity. However, in addition to providing the useful information, other identities of the individual might be provided, for example if the individual has set up a relevant policy rule in the IDM to allow this.

In a variant of this implementation, the IDM has association information which permits a user to get reputation-related information in other contexts. In one example, the IDM may contain an association of different identities and on-line personae on various social networking websites of an artist, for example a creator of music or a writer. The IDM is able to provide information relevant to comments, articles, discussions, video recordings, and musical compositions produced by the artist in response to a search request. This can be done without needing to reveal the artist's real name or different identities and on-line personae. However, revealing these may be permitted if the artist has indicated that this is to occur.

The IDM 14 may contain a historical record in respect of a user's real name. For example, in the case of a woman changing her surname on getting married, a search request in a service provider in respect of a real name may indicate that, in addition to searching among users' current real names, searching among maiden names is also to be carried out. If the service provider does not contain any association information between maiden names and married names, it contacts the IDM. The IDM has a historical record of name changes and cross-references between them. As a result, the IDM can receive a search request in respect of a maiden name, determine in a historical record that there is a current married name associated with it, and then determine pseudonym related information which is to be provided. This may involve a permission request being sent to, and responded to, by an individual about whom pseudonym related information may be provided.

In a similar way, the IDM may contain other types of information in terms of their current and earlier versions in order to enable other types of historical searches to be carried out.

The IDM can be used to provide information based on contact lists. In one embodiment, when a user registers for the first time with a new social networking website, he can request that the IDM uses contact information to which the IDM has access, for example in respect of an existing registration with a social networking website to which the user has already registered and then, taking the contact information (which may be in the form of real names or pseudonyms) determine, in respect of the contacts present in the contact list, their pseudonyms in the new social networking website. In this way, the user can newly join a social networking website and, very quickly, establish pseudonyms of individuals with whom the user had already had some contact. This is possible in respect of IDM-controlled users because the IDM contains relevant association information.

In another embodiment, the IDM can be used to provide information about contacts in other social networking websites. In this case, the user may be logged in to a social networking website and request that the IDM uses contact information for that social networking website, typically in the form of a list of pseudonyms, to carry out a search to reveal the pseudonyms which the contacts use in other social networking websites. As a result, for each contact in a contacts list, the user may obtain a list of the other social networking websites with which they have registered and their pseudonym in each. Of course, this requires that the contacts have provided appropriate information to the IDM, that is that they are IDM-controlled users. In this way, this embodiment of the invention can provide a sudden enhancement of the user's contact list(s).

These embodiments require that the IDM is provided, for its IDM-controlled users, with associations between their real names, the social networking websites with which they are registered, and their pseudonyms in each. The IDM may also have access to the contact list for which cross-referencing of contacts between social networking websites is to be carried out. This may be a general access which always applies or a specific one-off access provided for the cross-referencing to be carried out.

In these embodiments, a user's individual accounts at different service providers are treated as attributes and the IDM acts as social node creator.

The information about cross-referencing an individual's real identity to pseudonyms in other social networking websites may be revealed or held back according to policy rules which have been put in place by individuals represented by contacts in the contacts list.

In the foregoing, the invention has been described in relation to providing an association between a real world identity and a pseudonym. However, the invention is also capable of revealing an association between an attribute or attributes of a user, other than the user B's real name, and a pseudonym. This could be, for example, that they had attended a particular school. In such a case, the user A can perform a search for users registered with a service provider having such an attribute in common, assuming that the sought for users allow themselves, or at least their pseudonyms, to be identified. In this variant of the invention, the IDM contains an association between the attribute "school" and the pseudonym and/or real name.

Attribute searching using the IDM may only occur if a user has elected for a particular attribute to be contained (and thus mapped) in the IDM rather than in the SN application. In such a case, when the SN application receives a query in relation to the attribute, it recognises that it is in relation to an IDM-controlled attribute and sends the query to the IDM for the IDM to process and then provide a suitable response.

Another example of an attribute is location information. In an embodiment of the invention, the IDM 14 is provided with access to location information in respect of a user's mobile terminal device. This can be provided in an implementation in which the IDM 14 is under the control of a mobile network operator and the user is a subscriber of the operator. In this case, a search request is made to an SN application in respect of users who meet certain location criteria. The SN application refers the search request to the IDM which is able to determine the pseudonyms of individuals which meet the location criteria. As a result, the IDM is able to provide a list of pseudonyms and/or real names present at, or close to, a location. One reason to restrict the availability of the location information is that it can be real time automatically-updated location information, and thus, from the point of view of the user, sensitive.

In common with preceding embodiments, attribute searching may be carried out across a number of different social networks.

In a variant of attribute searching, the invention also enables temporary linking between individuals and accounts, for example in respect of a corporate entity such as a company having a presence on a social network website. In one example, a user page for the entity may be set up in respect of a periodic event such as an annual conference. When the event is to take place, an employee or representative of the entity is appointed as a contact person and any query, for example into a social networking website, in respect of the entity/event can be passed on to the IDM. In response, the IDM may provide pseudonym information of the employee or representative, for example to be included in the user page which is provided to a person requesting the information concerning the event.

In another embodiment of the invention, a corporate entity such as a company has an account with a social networking website. In the IDM, different employees or representatives are associated with the account, for example several people in different countries behind one social networking page. Accordingly, when a search request is received by the IDM having a geographical indicator, a result can be returned in respect of an individual who is most appropriate, for example in terms of location and/or responsibility.

In maintaining certain personal information which an IDM-controlled user wishes to keep private in the IDM 14 and not in the SN application 12, different service providers only have a partial picture of the user, even though they may handle several (unassociated) accounts for the same user. However, the IDM contains the necessary information to provide various associations. This can be used to reduce the burden on the user of setting up new accounts whether this is in relation to a service provider in which there is an already existing account for that user or in relation to a service provider in respect of which a first account for that user is being registered. The user can simply indicate in setting up the account that certain attributes are already in place at the IDM as IDM-controlled attributes.

The IDM 14 may contain pseudonyms mapped to one or more attributes instead of being mapped to a user's real name or, for a user, there may be mapping between the real name, one or more attributes, and the pseudonym. Associating a pseudonym to attribute information which is not a real name enables attribute searching without a real name needing to be entered as part of a search or returned as part of a result.

In this way the IDM may contain associations between users having common interests, an individual common to a number of social networking websites, and any other attributes in common.

The invention enables a website user to have a public presence on a service provider website while preventing third parties from carrying out a search using their real name and being able to associate this with their user page or pages. Although to some degree this can be provided by using settings and policies which are currently available within a service provider itself, the invention enables the user to have an extra degree of control by not needing to provide certain key information to a service provider website. This means that deliberate or inadvertent misuse of this key information and the associations it reveals can be prevented.

An advantage of the invention is that the IDM can be configured to provide settings and policies which are not conventionally provided by social networking websites and other service providers. Such features can enable greater flexibility in terms of information provision in response to queries while at the same time provide greater security of information. Examples of greater security are that a user's personal information can be put into the public domain and the ability to enable third parties such as prospective or current employers to associate this with the user's real world identity is controlled and/or moderated. Furthermore, policies can be modified or even revoked as time passes. In this way, if a user becomes concerned about the security of their personal information, stricter policies can be put in place in order to apply tighter controls to the personal information.

Another advantage of the invention is to carry out on-the-fly translation of pseudonyms into real names. Accordingly, whenever the IDM is to provide as a result pseudonym information in respect of any of its IDM-controlled users, it can immediately determine which real name is behind the pseudonym and provide a substitution which is transparent to the user receiving the result. This may also be applied to any other attributes which are controlled by the IDM where it is configured to carry out such a substitution and provided translated information.

In one embodiment of the invention, a search request or other query only goes to the IDM if the attribute is one which is controlled by the IDM.

Other embodiments of the invention may be implemented. In one embodiment, an IDM is used to provide targeted advertisements relevant to a particular user of an SN application. In this case, when the SN application is preparing a user page for a user, part of the user page is to contain advertising content and so the SN application contacts the IDM and makes a request for advertising content which is relevant to the user. The IDM refers this request to a network element comprising a database containing preferences associated with the user which are used to select relevant advertising content. The IDM then sends either a link or a placeholder to the SN application which points to or refers to the advertising content. In the case of the SN application receiving a link, it simply includes the link in the coding of the user page such that presentation of the user page causes the advertising content also to be presented. In the case of the SN application receiving a placeholder (such as an alpha-numeric string which is meaningless to any entity other than the IDM), this is also coded into the user page but when the browser of a terminal device of the user is rendering the user page, a software component in the terminal device referred to as a plug-in contacts the IDM which then sends the advertising content to the terminal device to be included directly into the user page during its rendering.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of providing data in response to a request comprising the steps of:
   at least one first entity receiving a request to provide data associated with an attribute;
   the at least one first entity determining that the request is for data which within the at least one first entity is not associated with the attribute;
   the at least one first entity referring the request to a second entity which contains an association between the data and the attribute;
   the second entity determining the data which is associated with the attribute; and
   the second entity providing an information item which is related to the data,
   wherein the at least one first entity is a social networking website.

2. A method according to claim 1 in which the request is a search request in respect of a real name to identify a pseudonym of a user registered with the at least one first entity having that real name.

3. A method according to claim 1 in which the data is a pseudonym.

4. A method according to claim 1 in which the attribute is a real name.

5. A method according to claim 1 in which the second entity is an identity management element.

6. A method according to claim 1 in which the information item is the data.

7. A method according to claim 1 in which the information item is not the data, but can be used to obtain the data directly from the second entity.

8. A method according to claim 1 in which a near-complete user record is stored in the at least one first entity and certain key information is stored in the second entity.

9. A method according to claim 1 in which the second entity is under the control of a network operator.

10. A method according to claim 1 in which an individual identified as a result of submission of the request provides a permission response to the second entity.

11. A method according to claim 1 in which the second entity is configured to serve at least two first entities.

12. A method according to claim 1 in which the second entity uses contact information in respect of the at least one first entity to carry out a search to reveal pseudonyms which contacts use in another first entity.

13. A method according to claim 1 in which the request only goes to the second entity if the at least one first entity determines that the attribute is one which is controlled by the second entity.

14. A system for providing data in response to a request comprising:
   a first entity configured to receive a request to provide data associated with an attribute and configured to determine that the request is for data which is not associated with the attribute within the first entity; and
   a second entity containing an association between the data and the attribute which is configured to receive the request from the first entity, the second entity being configured to determine the data which is associated with the attribute and being configured to provide an information item which is related to the data,
   wherein the first entity is a social networking website.

15. A server for providing a response to a request comprising:
   an input block configured to receive a request to provide data associated with an attribute from a first entity which has determined that the request is for data which is not associated with the attribute within the first entity;
   a store containing the data and the attribute and an association between them;

a determining block configured to determine the data which is associated with the attribute; and an output block configured to provide an information item which is related to the data, wherein the first entity is a social networking website.

16. A computer program product embodied on a non-transitory computer-readable medium, comprising software code that when executed on a computing system performs a method of providing data in response to a request comprising the steps of:

a first entity receiving a request to provide data associated with an attribute;

the first entity determining that the request is for data which within the first entity is not associated with the attribute;

the first entity referring the request to a second entity which contains an association between the data and the attribute;

the second entity determining the data which is associated with the attribute; and the second entity providing an information item which is related to the data, wherein the first entity is a social networking website.

17. A computer program product according to claim 16 which has executable code portions which are configured to carry out the steps of the method.

* * * * *